United States Patent
Iyer

(10) Patent No.: US 10,169,518 B1
(45) Date of Patent: Jan. 1, 2019

(54) METHODS FOR DELAYING REGISTER RESET FOR RETIMED CIRCUITS

(71) Applicant: Intel Corporation, Santa Clara, CA (US)

(72) Inventor: Mahesh A. Iyer, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 15/342,286

(22) Filed: Nov. 3, 2016

(51) Int. Cl.
*G06F 17/50* (2006.01)

(52) U.S. Cl.
CPC ...... *G06F 17/5072* (2013.01); *G06F 17/5054* (2013.01)

(58) Field of Classification Search
USPC .......................................... 716/119
See application file for complete search history.

(56) References Cited

U.S. PATENT DOCUMENTS

| | | |
|---|---|---|
| 7,120,883 B1 | 10/2006 | van Antwerpen et al. |
| 7,689,955 B1 | 3/2010 | van Antwerpen et al. |
| 8,402,408 B1 | 3/2013 | van Antwerpen et al. |
| 8,863,067 B1 | 10/2014 | Caldwell et al. |
| 9,053,274 B1 | 6/2015 | van Antwerpen et al. |
| 9,292,638 B1 | 3/2016 | Chiu |
| 9,356,769 B2 | 5/2016 | Lin |
| 2002/0152060 A1* | 10/2002 | Tseng ...................... G06F 13/22 703/17 |
| 2003/0144828 A1* | 7/2003 | Lin ...................... G06F 15/7864 703/21 |
| 2012/0124423 A1* | 5/2012 | Chakravadhanula ........................ G01R 31/31727 714/27 |
| 2012/0126850 A1* | 5/2012 | Wasson ............... G06F 15/7867 326/38 |

OTHER PUBLICATIONS

Iyer at el., U.S. Appl. No. 15/140,327, filed Apr. 27, 2016.
(Continued)

*Primary Examiner* — Mohammed Alam
(74) *Attorney, Agent, or Firm* — Treyz Law Group, P.C.; Tianyi He

(57) ABSTRACT

An integrated circuit design may include registers and combinational logic. The registers may be reset using an original reset sequence. Integrated circuit design computing equipment may perform register moves within the circuit design, whereby registers are moved across one or more portions of the combinational logic. When moving the registers, counter values may be maintained for a group of non-justifiable elements within the combinational logic, across which the registers may move. The counter values may be maintained and updated on a per element, per clock domain basis to account for register moves across the corresponding non-justifiable elements. The maximum counter value for each clock domain may be chosen as an adjustment value that may be used to generate an adjustment sequence. The adjustment sequence may be prepended to the original reset sequence to generate an adjusted reset sequence that properly resets registers within the integrated circuit after registers moves.

19 Claims, 14 Drawing Sheets

(56) References Cited

OTHER PUBLICATIONS

Iyer et al., "Identifying Sequential Redundancies Without Search", DAC '96 Proceedings of the 33rd annual Design Automation Conference, Jun. 1, 1996, pp. 457-462, ACM New York, NY. ISBN: 0-89791-779-0 doi: 10.1145/240518.240605.

Iyer et al., Surprises in Sequential Redundancy Identification, EDTC '96 Proceedings of the 1996 European conference on Design and Test, 1996, p. 88, IEEE Computer Society Washington, DC. ISBN:0-8186-7423-7 doi:10.1109/EDTC.1996.494131.

Singhal et al., "The Validity of Retiming Sequential Circuits", DAC '95 Proceedings of the 32nd annual ACM/IEEE Design Automation Conference, 1995, pp. 316-321, ACM New York, NY. ISBN:0-89791-725-1 doi: 10.1145/217474.217548.

Mneimneh et al., "REVERSE: Efficient Sequential Verification for Retiming" International Workshop on Logic and Synthesis, 2003, University of Michigan, 6 pages.

M.A. Iyer, "On Ensuring the Validity of Retiming Sequential Circuits with Applications to FPGA High Performance Design and Verification", Altera/Intel PSG internal document, Apr. 2016.

V. Singhal, "Design Replacements for Sequential Circuits", Ph. D. Thesis, Department of Computer Science, University of California, Berkeley, Mar. 1996.

M.A. Iyer, "On Redundancy and Untestability in Sequential Circuits", Ph.D. Thesis, Department of Electrical Engineering, Illinois Institute of Technology, Chicago, Jul. 1995.

Alle et al., "Runtime Dependency Analysis for Loop Pipelining in High-Level Synthesis" DAC '13, May 29-Jun. 7, 2013, Austin, TX, USA, ACM 978-1-4503-2071-9/13/05, 10 pages.

Venkat et al., "Automating Wavefront Parallelization for Sparse Matrix Computations" SC16; Nov. 2016, Salt Lake City, Utah, USA, IEEE, 978-1-4673-8815-3/16, 12 pages.

* cited by examiner

METHODS FOR DELAYING REGISTER RESET FOR RETIMED CIRCUITS

BACKGROUND

This relates to integrated circuits and, more particularly, to generating reset sequences for registers within an integrated circuit design.

Every transition from one technology node to the next has resulted in smaller transistor geometries and thus potentially more functionality implemented per unit area on an integrated circuit die. Synchronous integrated circuits have further benefited from this development as evidenced by reduced interconnect and cell delays, which have led to performance increases.

To further increase the performance, solutions such as register retiming have been proposed, where registers are moved among portions of combinational logic, thereby achieving a more balanced distribution of delays between registers, and thus the integrated circuit may be operated at a potentially higher clock frequency.

The registers are typically implemented using clock-edge-triggered flip-flops. Prior to retiming, when the integrated circuit is powered up, these digital flip-flops are also powered to an initial state, but this initial state may be unknown. Therefore, a reset sequence is typically provided to the flip-flops to reset the flip-flops and bring them to a known reset state.

However, after retiming, the retimed integrated circuit may behave differently from the integrated circuit prior to retiming. In some cases, the same reset sequence provided to the flip-flops prior to retiming will not work with the retimed flip-flops. Therefore, it would be desirable to account for flip-flops moved during retiming and to provide an updated reset sequence for the retimed flip-flops.

It is within this context that the embodiments herein arise.

SUMMARY

This relates generally to integrated circuits and, more particularly, to methods for using integrated circuit design computing equipment to generate reset sequences for registers within a circuit design. Computer-aided design (CAD) tools implemented on integrated circuit design computing equipment are often used to perform register move operations (e.g., register retiming, register duplication, register merging) to improve the overall circuit performance of the circuit design.

The circuit design may include multiple registers that are resettable using a first reset sequence sometimes referred to as an "original sequence." A given register move operation (e.g., a move operation associated with register retiming, register duplication, or register merging) performed by the CAD tools may move a first register in the plurality of registers across a first circuit element. A second register move operation performed by the CAD tools may move a second register in the plurality of registers across a second circuit element. A first counter value associated with the first element may be maintained and updated. A second counter value associated with the second element may be maintained and updated.

In accordance with an embodiment, the first circuit element may be a non-justifiable element that has inputs and outputs. All possible output values at the outputs of the justifiable element may be obtainable using some combination of input values from the inputs. A non-justifiable element is an element that is not justifiable. The non-justifiable element may be a fan-out node (e.g., a fan-out circuit that connects a single node to multiple destination circuits simultaneously). The first register move operation may be a forward move that moves the first register from the inputs of the first circuit element to the outputs of the first circuit element. The first counter value may be incremented as a result of the first register move operation.

The second circuit element may have inputs and outputs. The second move operation may be a forward move that moves the second register from the input of the second circuit element to the output of the second circuit element. The second counter value may be maintained (e.g., the second counter value may remain unchanged) as a result of the second move operation if the second circuit element is a justifiable element.

In accordance with an embodiment, the CAD tools may also perform global retiming operations on the circuit design. During global retiming, the CAD tools may compute a retiming variable for the first element (e.g., a retiming value $r_i$ for the $i^{th}$ element). A positive value of the retiming variable for an element indicates backward movement of that many flip-flops across that element. Similarly, a negative value of the retiming variable for an element indicates forward movement of that many flip-flops across that element. The retiming variable for the first non-justifiable element may be subtracted from the first counter value that is incremented by the first register move operation to generate an updated counter value.

The first reset sequence may be prepended by an adjustment sequence having a number of clock cycles with arbitrary primary input values to generate an adjusted reset sequence. The number of clock cycles may be computed based on a maximum of most updated versions of the first and second counter values. Optionally, if the original reset sequence is already pre-padded with a fixed number of empty clock cycles, these pre-padded number of clock cycles may be reduced without preventing the plurality of registers within the circuit from reaching the reset state using the adjusted reset sequence. In other words, subsequent to implementing the circuit design on an integrated circuit, the integrated circuit may be powered on with the plurality of registers within the integrated circuit at an unknown state. By using the adjusted reset sequence, the plurality of registers may be reset to a known state. Operated in this way, a tangible improvement to the integrated circuit is provided since the retimed circuit can be reset properly to a desired state by simply delaying the original reset sequence by some amount of clock cycles.

Further features of the invention, its nature and various advantages will be more apparent from the accompanying drawings and following detailed description.

DETAILED DESCRIPTION

The presented embodiments relate to integrated circuits and, more particularly, to modeling registers during register retiming operations.

Performing retiming operations on an integrated circuit may change the configuration of registers within the integrate circuit. In some cases, the retimed registers will not accurately reset using the reset sequence for registers prior to retiming (e.g., a reset sequence provided by a designer for a corresponding circuit design).

It would therefore be desirable to provide an improved way of modeling registers moved during retiming to calculate an adjustment value and generate a retimed reset sequence using the calculated adjustment value and the reset sequence used prior to retiming. In accordance with an embodiment, this can be accomplished by tracking the movement of retimed registers across different types of circuit elements. Operated in this way, a minimum length of a prepended adjustment sequence used in the retimed reset sequence may be calculated.

It will be recognized by one skilled in the art, that the present exemplary embodiments may be practiced without some or all of these specific details. In other instances, well-known operations have not been described in detail in order not to unnecessarily obscure the present embodiments.

Figure 1:
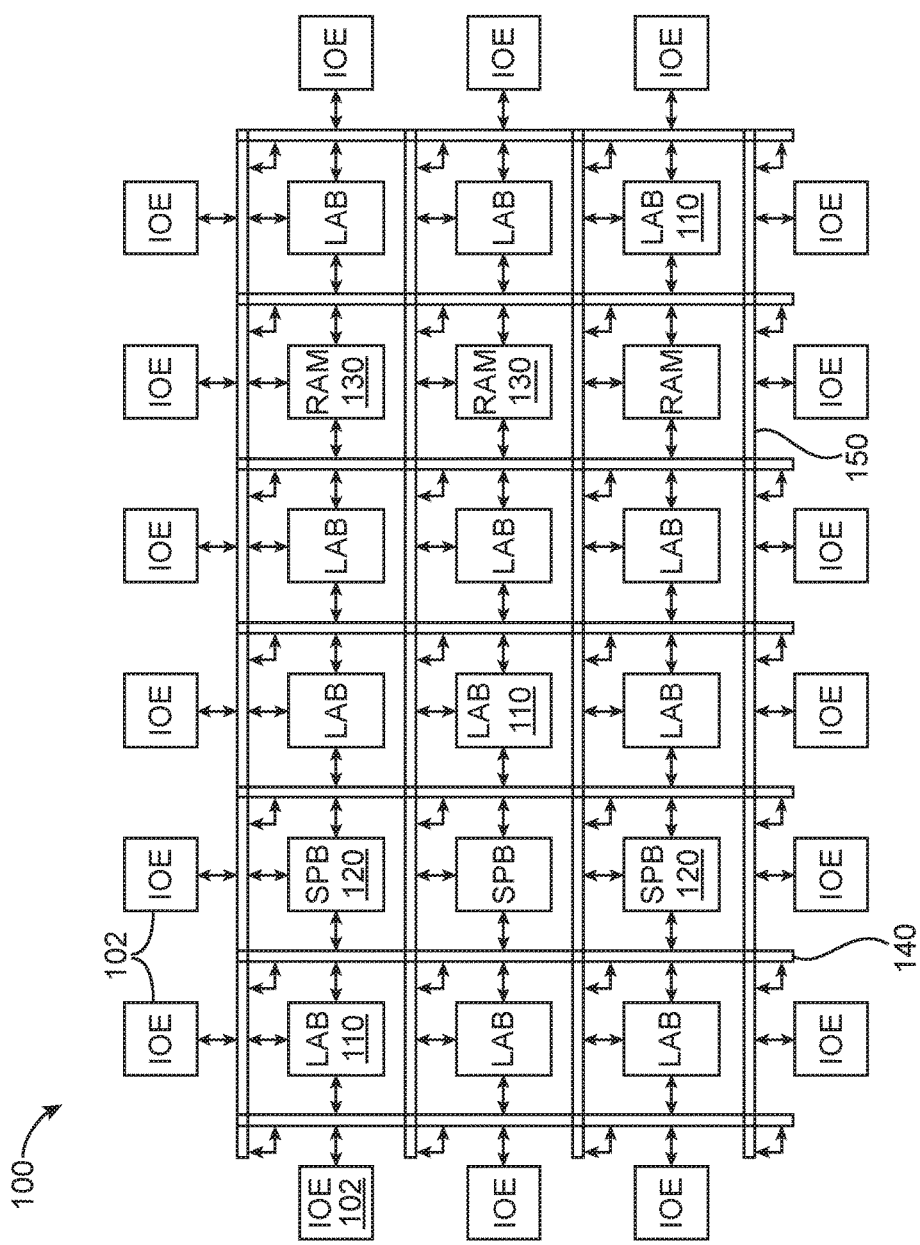
FIG. 1 is a diagram of an illustrative programmable integrated circuit in accordance with an embodiment.

An illustrative embodiment of a programmable integrated circuit such as programmable logic device (PLD) 100 that may be configured to implement a circuit design is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input-output elements (IOEs) 102. Once loaded, the memory elements each provide a corresponding static control signal that controls the operation of an associated functional block (e.g., LABs 110, DSP 120, RAM 130, or input-output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), or programmable memory elements.

In addition, the programmable logic device may have input-output elements (IOEs) 102 for driving signals off of PLD 100 and for receiving signals from other devices. Input-output elements 102 may include parallel input-output circuitry, serial data transceiver circuitry, differential receiver and transmitter circuitry, or other circuitry used to connect one integrated circuit to another integrated circuit.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

If desired, programmable logic device (PLD) 100 may be configured to implement a custom circuit design. For example, the configuration RAM may be programmed such that LABs 110, DSP 120, and RAM 130, programmable interconnect circuitry (i.e., vertical channels 140 and horizontal channels 150), and the input-output elements 102 form the circuit design implementation.

Figure 2:
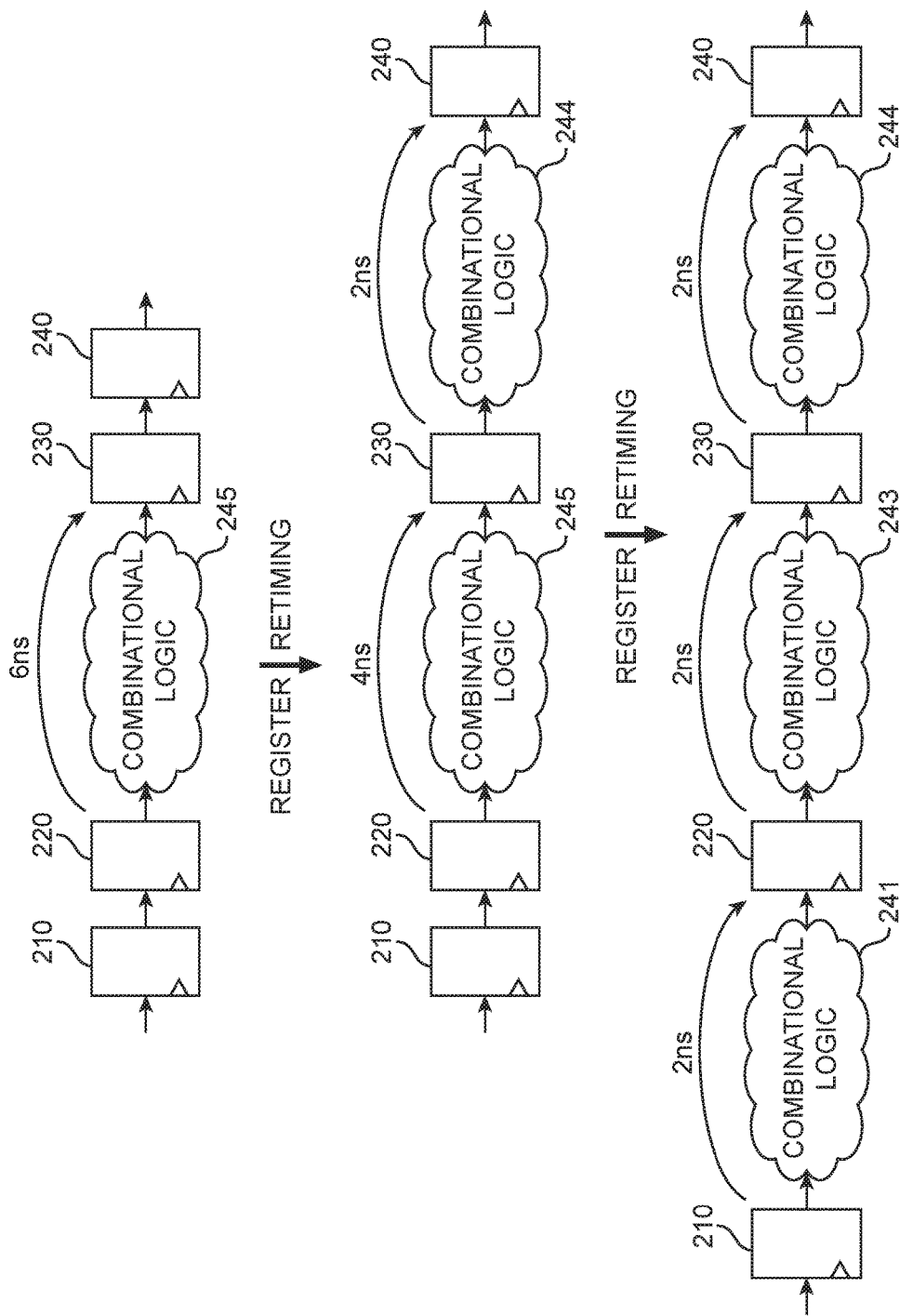
FIG. 2 is a diagram of illustrative retiming operations in accordance with an embodiment.

FIG. 2 shows an example of different versions of a circuit design that PLD 100 may implement. The first version of the circuit design may include registers 210, 220, 230, 240, and combinational logic 245. Register 210 may send a signal to register 220; register 220 may send the signal through combinational logic 245 to register 230; and register 230 may send the signal to register 240. As an example, the delay on the path from register 220 through combinational logic 245 to register 230 may have a delay of 6 nanoseconds (ns), whereas the delay between register 210 and 220 and between registers 230 and 240 may have a delay of 0 ns. Thus, the first version of the circuit design may operate at a frequency of 166 MHz.

Performing register retiming on the first version of the circuit design may create a second version of the circuit design. For example, register 230 may be pushed back through a portion of combinational logic 245 (sometimes referred to as backward retiming), thereby separating combinational logic 245 of the first version of the circuit design into combinational logic 242 and 244 of the second version of the circuit design. In the second version of the circuit design, register 210 may send a signal to register 220; register 220 may send the signal through combinational logic 242 to register 230; and register 230 may send the signal through combinational logic 244 to register 240.

As an example, the delay on the path from register 220 through combinational logic 242 to register 230 may have a delay of 4 ns, and the delay from register 230 through combinational logic 244 to register 240 may have a delay of 2 ns. Thus, the second version of the circuit design may operate at a frequency of 250 MHz, which is limited by the path with the longest delay (sometimes referred to as the critical path).

Performing register retiming on the second version of the circuit design may create a third version of the circuit design. For example, register 220 may be pushed forward through a portion of combinational logic 242 (sometimes referred to as "forward" retiming), thereby separating combinational logic 242 of the second version of the circuit design into combinational logic 241 and 243 of the third version of the circuit design. In the third version of the circuit design, register 210 may send a signal through combinational logic 241 to register 220; register 220 may send the signal through combinational logic 243 to register 230; and register 230 may send the signal through combinational logic 244 to register 240.

Figure 3:
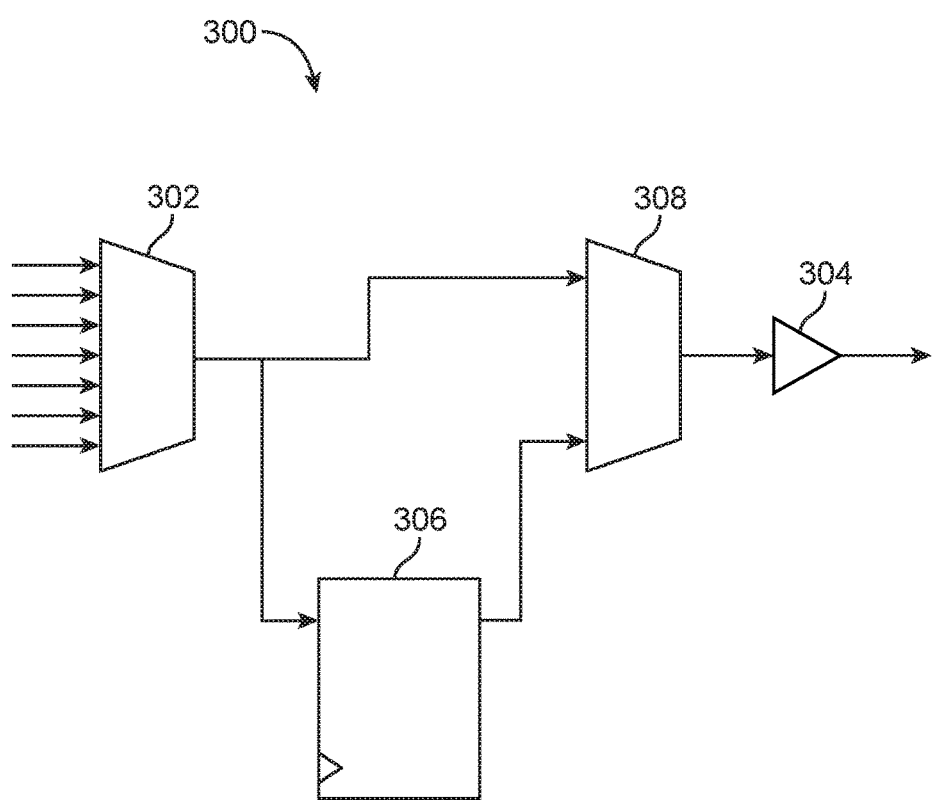
FIG. 3 is a diagram of an illustrative pipelined routing resource which uses a register to pipeline a routing signal in accordance with an embodiment.

As an example, the delay on the paths from register 210 through combinational logic 241 to register 220, from register 220 through combinational logic 243 to register 230, and from register 230 through combinational logic 244 to register 240 may all have a delay of 2 ns. Thus, the third version of the circuit design may operate at a frequency of 500 MHz, which is thrice the frequency at which the first version of the circuit design may operate. If desired, routing resources such as the vertical routing channels 140 or the horizontal routing channels 150 of FIG. 1 may include pipeline elements, which can facilitate register retiming. FIG. 3 depicts a pipelined routing resource 300 which uses a register in accordance with an embodiment. As shown, the pipelined routing resource 300 includes a first multiplexer 302, a driver 304, a register 306, and a second multiplexer 308.

Multiplexer 302 may be a driver input multiplexer (DIM) or a functional block input multiplexer (FBIM). A DIM may select a signal from multiple sources and send the selected signal to driver 304 that drives a corresponding wire. The multiple sources may include signals from outputs of functional blocks and other routing wires that travel in the same or in an orthogonal direction to the wire. A FBIM outputs a signal to a functional block and may select the signal from multiple routing wires.

As shown in FIG. 3, multiplexer 302 may be pipelined by providing its output to the data input of register 306. Multiplexer 308 in pipelined routing resource 300 may receive the output of multiplexer 302 directly and may also receive the data output from register 306.

Although pipelined routing resource 300 includes register 306, it will be recognized by one skilled in the art that different register implementations may be used to store a routing signal such as an edge-triggered flip-flop, a pulse latch, a transparent-low latch, a transparent-high latch, just to name a few. Thus, in order not to unnecessarily obscure the present embodiments, we refer to the storage circuit in the pipelined routing resource as a pipeline storage element.

Multiplexer 308 may enable the pipelined routing resource 300 to be either used in a non-pipeline mode or in a pipeline register mode. In the non-pipeline mode, the output of multiplexer 308 selects the direct output of multiplexer 302. In the pipeline mode, multiplexer 308 may select the output of register 306. Multiplexer 308 may provide its output to driver circuit 304, and the output of driver circuit 304 may be used to drive a routing wire. The routing wire may span multiple functional blocks (e.g., for a pipelined routing resource with a DIM). Alternatively, the routing wire may be inside a functional block (e.g., for a pipelined routing resource with a FBIM).

Every DIM/FBIM may include a register such as register 306 such that all the routing multiplexers are pipelined. However, in some embodiments, that may be unnecessary as the capabilities provided may exceed design requirements. Thus, in certain embodiments only a fraction, such as one-half or one-fourth, of the routing multiplexers may be pipelined. For example, a signal may take 150 picoseconds (ps) to traverse a wire of a given length, but a clock signal may be constrained to operate with a 650 ps clock cycle. Thus, providing a pipeline register such as register 306 every fourth wire may be sufficient in this example. Alternatively, the registers may be placed more frequently than every fourth wire (e.g., every second wire) to provide a higher degree of freedom in selection of which registers are used.

Pipelined routing resources such as pipelined routing resource 300 may facilitate register retiming operations, such as the register retiming illustrated in FIG. 2. For example, consider the scenario in which register 230 is implemented by a first instance of a pipelined routing element that is operated in pipeline register mode (i.e., register 230 is implemented by register 306 of a first instance of a pipelined routing resource 300). Consider further that the path from register 220 through combinational logic 245 to register 230 includes a second instance of a pipelined routing element that is operated in non-pipeline mode. Thus, switching the first instance of the pipelined routing element from operating in pipeline register mode to operating in non-pipeline mode and switching the second instance of the pipelined routing element from operating in non-pipeline mode to operating in pipeline register mode may transform the first version into the second version of the circuit design presented in FIG. 2.

Computer-aided design (CAD) tools in a circuit design system may evaluate whether register retiming may improve the performance of a current version of a circuit design or whether the current version of the circuit design meets a given performance criterion. If desired, and in the event that the CAD tools determine that register retiming would improve the performance of the current version of the circuit design or that the current version of the circuit design misses the given performance criterion, the CAD tools may execute register retiming operations that transform the current version of the circuit design into another version of the circuit design (e.g., as illustrated in FIG. 2).

Figure 4:
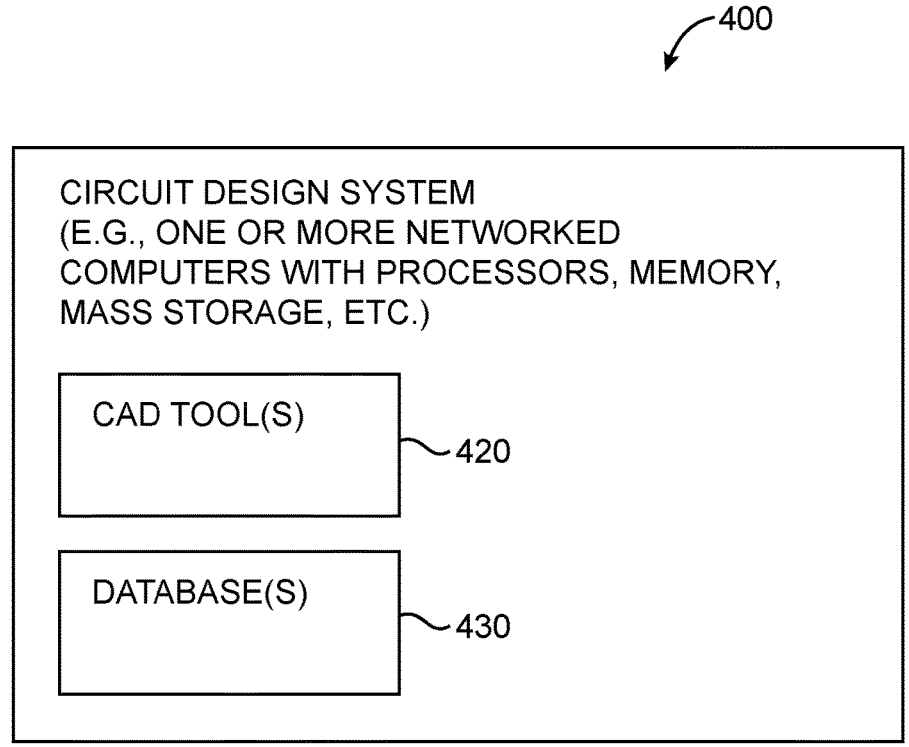
FIG. 4 is a diagram of a circuit design system that may be used to design integrated circuits in accordance with an embodiment.

An illustrative circuit design system 400 in accordance with an embodiment is shown in FIG. 4. Circuit design system 400 may be implemented on integrated circuit design computing equipment. For example, system 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s). When the software of system 400 is installed, the storage of system 400 has instructions and data that cause the computing equipment in system 400 to execute various methods (processes). When performing these processes, the computing equipment is configured to implement the functions of the circuit design system.

The computer aided design (CAD) tools 420, some or all of which are sometimes referred to collectively as a CAD tool, a circuit design tool, or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 5:
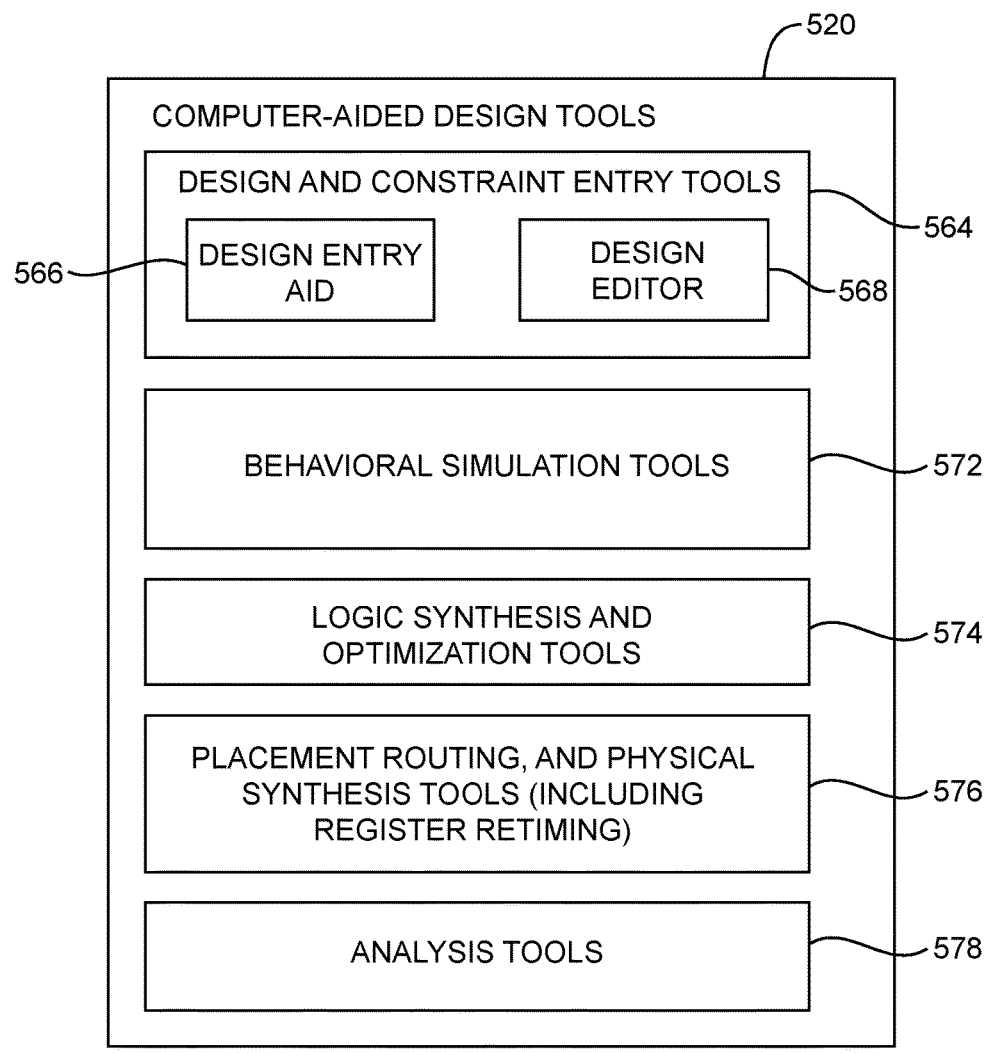
FIG. 5 is a diagram of illustrative computer-aided design (CAD) tools that may be used in a circuit design system in accordance with an embodiment.

Illustrative computer aided design tools 520 that may be used in a circuit design system such as circuit design system 400 of FIG. 4 are shown in FIG. 5.

The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 564 may be used to allow a circuit designer to provide a desired circuit design using any suitable format. For example, design and constraint entry tools 564 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 564 may allow the circuit designer to provide a circuit design to the circuit design system 400 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 568. Blocks of code may be imported from user-maintained or commercial libraries if desired.

After the design has been entered using design and constraint entry tools 564, behavioral simulation tools 572 may be used to simulate the functional performance of the circuit design. If the functional performance of the design is incomplete or incorrect, the circuit designer can make changes to the circuit design using design and constraint entry tools 564. The functional operation of the new circuit design may be verified using behavioral simulation tools 572 before synthesis operations have been performed using tools 574. Simulation tools such as behavioral simulation tools 572 may also be used at other stages in the design flow if desired (e.g., after logic synthesis). The output of the behavioral simulation tools 572 may be provided to the circuit designer in any suitable format (e.g., truth tables, timing diagrams, etc.).

Once the functional operation of the circuit design has been determined to be satisfactory, logic synthesis and optimization tools 574 may generate a gate-level netlist of the circuit design, for example using gates from a particular library pertaining to a targeted process supported by a foundry, which has been selected to produce the integrated circuit. Alternatively, logic synthesis and optimization tools 574 may generate a gate-level netlist of the circuit design using gates of a targeted programmable logic device (i.e., in the logic and interconnect resources of a particular programmable logic device product or product family).

Logic synthesis and optimization tools 574 may optimize the design by making appropriate selections of hardware to implement different logic functions in the circuit design based on the circuit design data and constraint data entered by the logic designer using tools 564. As an example, logic synthesis and optimization tools 574 may perform multi-level logic optimization and technology mapping based on the length of a combinational path between registers in the circuit design and corresponding timing constraints that were entered by the logic designer using tools 564.

After logic synthesis and optimization using tools 574, the circuit design system may use tools such as placement, routing, and physical synthesis tools 576 to perform physical design steps (layout synthesis operations). Tools 576 can be used to determine where to place each gate of the gate-level netlist produced by tools 574. For example, if two counters interact with each other, tools 576 may locate these counters in adjacent regions to reduce interconnect delays or to satisfy timing requirements specifying the maximum permitted interconnect delay. Tools 576 create orderly and efficient implementations of circuit designs for any targeted integrated circuit (e.g., for a given programmable integrated circuit such as a field-programmable gate array (FPGA)).

Tools such as tools 574 and 576 may be part of a compiler suite (e.g., part of a suite of compiler tools provided by a programmable logic device vendor). In certain embodiments, tools such as tools 574, 576, and 578 may also include timing analysis tools such as timing estimators. This allows tools 574 and 576 to satisfy performance requirements (e.g., timing requirements) before actually producing the integrated circuit.

As an example, tools 574 and 576 may perform register retiming by moving registers through combinational logic (e.g., through logic AND, OR, XOR, and other suitable gates, look-up tables (LUTs), multiplexers, arithmetic operators, etc.). Tools 574 and 576 may push registers forward or backward across combinational logic as illustrated in FIG. 2. If desired, tools 574 and 576 may perform forward and backward pushes of registers by configuring pipelined routing resources such as pipelined routing resource 300 of FIG. 3 to operate in non-pipeline mode or as a pipelined routing element. Physical synthesis tools 576 used in this way can therefore also be used to perform register retiming.

After an implementation of the desired circuit design has been generated using tools 576, the implementation of the design may be analyzed and tested using analysis tools 578. For example, analysis tools 578 may include timing analysis tools, power analysis tools, or formal verification tools, just to name few.

After satisfactory optimization operations have been completed using tools 520 and depending on the targeted integrated circuit technology, tools 520 may produce a mask-level layout description of the integrated circuit or configuration data for programming the programmable logic device.

Figure 6:
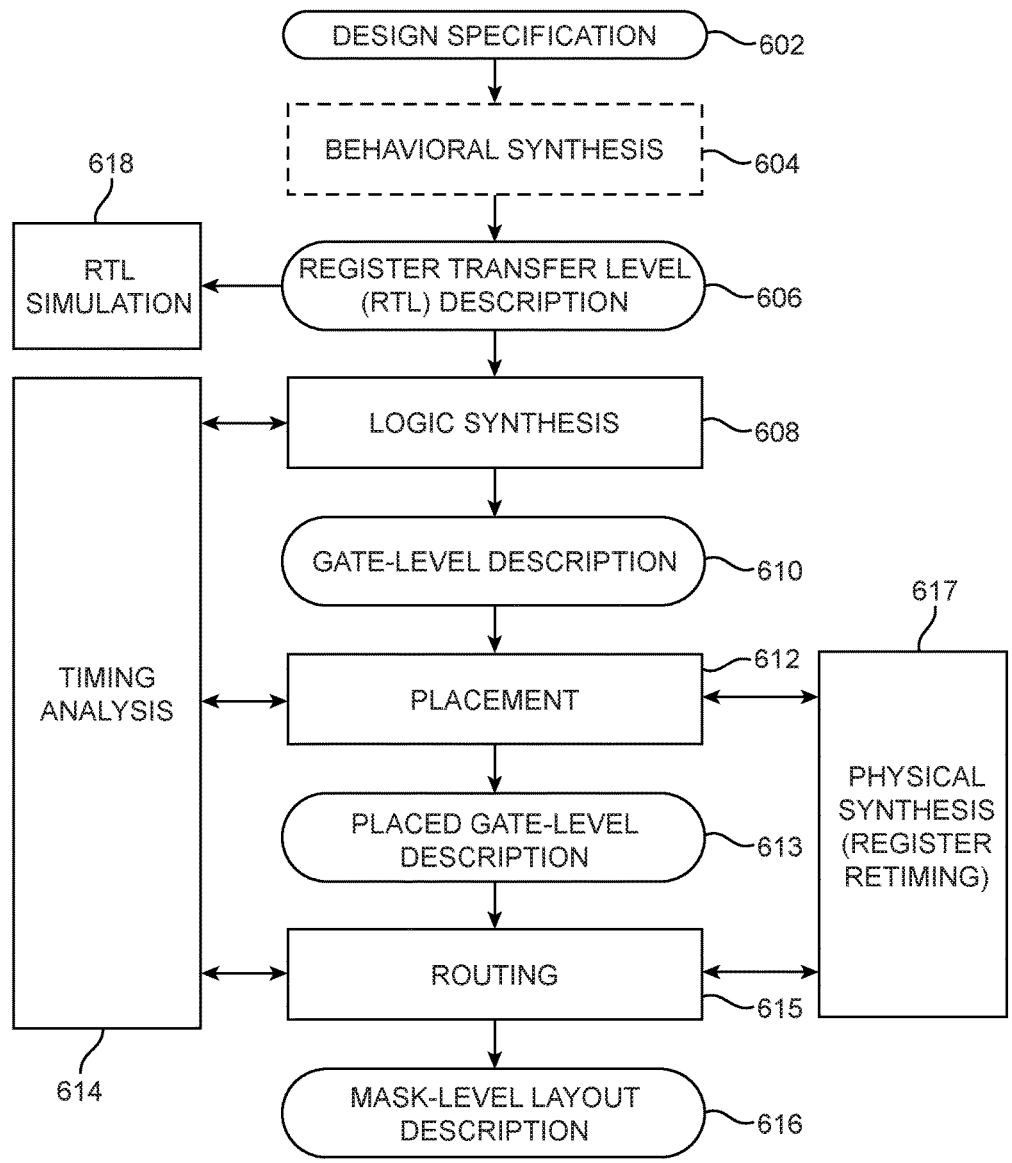
FIG. 6 is a flow chart of illustrative steps for designing an integrated circuit in accordance with an embodiment.

Illustrative operations involved in using tools 520 of FIG. 5 to produce the mask-level layout description of the integrated circuit are shown in FIG. 6. As shown in FIG. 6, a circuit designer may first provide a design specification 602. The design specification 602 may, in general, be a behavioral description provided in the form of an application code (e.g., C code, C++ code, SystemC code, OpenCL code, etc.). In some scenarios, the design specification may be provided in the form of a register transfer level (RTL) description 606.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation.

In general, the behavioral design specification 602 may include untimed or partially timed functional code (i.e., the application code does not describe cycle-by-cycle hardware behavior), whereas the RTL description 606 may include a fully timed design description that details the cycle-by-cycle behavior of the circuit at the register transfer level.

Design specification 602 or RTL description 606 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 602, the RTL description 606 (e.g., as a pragma or as an assertion), in a constraint file, or through user input (e.g., using the design and constraint entry tools 564 of FIG. 5), to name a few.

At step 604, behavioral synthesis (sometimes also referred to as algorithmic synthesis) may be performed to convert the behavioral description into an RTL description 606. Step 604 may be skipped if the design specification is already provided in form of an RTL description.

At step 618, behavioral simulation tools 572 may perform an RTL simulation of the RTL description, which may verify the functionality of the RTL description. If the functionality of the RTL description is incomplete or incorrect, the circuit designer can make changes to the HDL code (as an example). During RTL simulation 618, actual results obtained from simulating the behavior of the RTL description may be compared with expected results.

During step 608, logic synthesis operations may generate gate-level description 610 using logic synthesis and optimization tools 574 from FIG. 5. If desired, logic synthesis operations may perform register retiming as illustrated in FIG. 2 according to the constraints that are included in design specification 602 or RTL description 606. The output of logic synthesis 608 is gate-level description 610.

During step 612, placement operations using for example placement tools 576 of FIG. 5 may place the different gates in gate-level description 610 in a preferred location on the targeted integrated circuit to meet given target criteria (e.g., minimize area and maximize routing efficiency or minimize path delay and maximize clock frequency or any combination thereof). The output of placement 612 is placed gate-level description 613, that satisfies the legal placement constraints of the underlying target device.

During step 615, routing operations using for example routing tools 576 of FIG. 5 may connect the gates from the placed gate-level description 613. Routing operations may attempt to meet given target criteria (e.g., minimize congestion, minimize path delay and maximize clock frequency or any combination thereof). The output of routing 615 is a mask-level layout description 616 (sometimes referred to as routed gate-level description 616).

While placement and routing is being performed at steps 612 and 615, physical synthesis operations 617 may be concurrently performed to further modify and optimize the circuit design (e.g., using physical synthesis tools 576 of FIG. 5). If desired, register retiming operations may be performed during physical synthesis step 617. For example, registers in the placed gate-level description 613 or the routed gate-level description 616 may be moved around according to the constraints that are included in design specification 602 or RTL description 606.

As an example, register retiming operations may change the configuration of some pipelined routing resources (e.g., some instances of pipelined routing resource 300 of FIG. 3) from operating in pipeline register mode to operating in non-pipelined mode and the configuration of other pipelined routing resources (e.g., other instances of pipelined routing resources 300 of FIG. 3) from operating in non-pipelined mode to operating in pipeline register mode. To avoid obscuring the embodiments, the change of states for pipeline routing resources may be referred to simply as a move (e.g., movement) of pipeline registers (e.g., pipelined routing resources that operate in pipeline register mode).

For example, in a first scenario, changing the configuration of a given pipelined routing resource from operating in pipeline register mode to operating in non-pipelined mode may be referred to removing a pipeline register. For example, in a second scenario, changing the configuration of another given pipelined routing resource from operating in non-pipelined mode to operating in pipeline register mode may be referred to as adding a pipeline register. When the first and second scenarios correspond to each other (e.g., occur simultaneously, a pipeline register may be referred to as being moved from the location of the removed pipeline register to the location of the added pipeline register.

In accordance with an embodiment of the present invention, pipeline registers (e.g., register 306 in FIG. 3) within an integrated circuit (e.g., PLD 100) may collectively have a number of possible states (e.g., during power-up, during reset, during normal operation, etc.). For example, a possible state may be a state in which all of the pipeline registers within an integrated circuit all have values of "0" (e.g., store a value of "0"). Another possible state may be a state in which all of the pipeline registers within an integrated circuit all have values of "1" (e.g., store a value of "1". In yet another example, a first group of pipeline registers may store values of "0" and a second group of pipeline registers may store values of "1". This is merely illustrative. If desired, any set of states may be stored at the pipeline registers within an integrated circuit at any given time.

Figure 7:
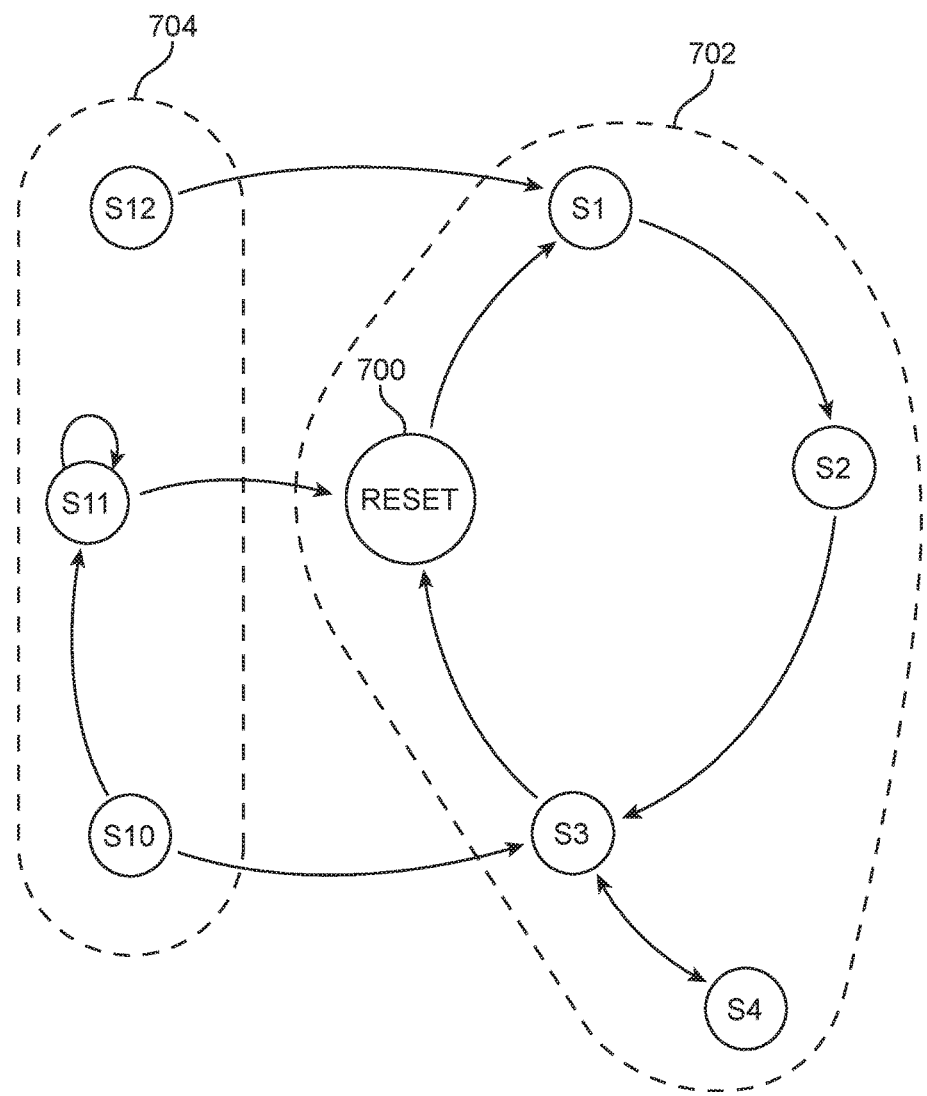
FIG. 7 is a diagram of an illustrative graph of possible states that pipeline registers may transition between in accordance with an embodiment.

FIG. 7 shows a diagram of a number of possible states associated with exemplary data latching registers within an integrated circuit (e.g., PLD 100). The registers of FIG. 7 may be normal user registers or pipeline registers that are used to help improve the performance of device 100. In particular, possible states associated with the registers (e.g., a set of pipeline registers 306 within PLD 100, a set of any registers within PLD 100, a set of any registers within a logic circuit, etc.) may include states S1, S2, S3, S4, S10, S11, S12, and Reset.

Arrows that point from a first given state to a second given state may indicate possible transitions from the first given state to the second given state. The possible transitions may occur when the registers are clocked using one or more clock signals (e.g., after a clock cycle of a clock signal, at a rising edge of a clock signal, at a falling edge of a clock signal, at both the rising and falling edges of a clock signal, etc.) to help the registers latch an incoming state value. In other words, during a single state transition, the primary inputs may have a new set of values and the registers may be clocked for a single clock cycle to provide a new set of values to the registers to hold. As an example, a first rising clock edge may cause the registers to transition from state S12 to state S1. As another example, a second rising clock edge may be a self-cycling transition, such as when state S11 makes no transition (e.g., state S11 is maintained).

The arrows may have directionality. For example, transition from state S12 to state S1 may occur as indicated by the direction of the allow linking the two states. In contrast, state S1 to state S12 may be an impossible transition since the arrow does not point in that direction. Furthermore, state S12 to state S11 may also be an impossible transition because there is no direct path linking the two. However, this is merely illustrative. If desired, the states and transitions between the states may be in accordance with a given set of registers that may have any suitable behavior. For example, states S3 and S4 may transition between one another.

Power-up circuitry or start-up circuitry (e.g., initialization circuitry) within integrated circuit 100 may power up registers, and thus providing the registers with an unknown state. To operate the integrated circuit, it may be desirable to reset registers to a known state upon device startup. The known initialized state may be referred to as a reset state (e.g., reset state 700). To reach reset state 700, one or more clock signals may be clocked to provide a reset sequence (e.g., a particular set of transitions between the possible states) to the registers. Initialization circuitry may be used to provide the reset sequence to the registers, if desired. The reset sequence may be a set of transitions that guarantees that no matter which state the registers powered up to, the reset state 700 may be reached using the reset sequence. For example, a reset sequence may transition to state S3 for some initial states before making the final transition to reset state 700. As another example, the reset sequence may cause the registers to transition from state S11 to reset state 700. This is merely illustrative. If desired, any reset sequence may be used to bring the pipeline registers to reset state 700.

After reaching reset state 700, the pipeline registers may operate in a first set of states referred to as legal states such as legal states 702. In other words, after resetting the pipeline registers, only the legal states may be accessible by the pipeline registers. The states that may not be accessed after reset operations are referred to as illegal states such as illegal states 704. For example, after reaching reset state 700, all further transitions from reset state 700 may cycle between states S1, S2, S3, S4, and Reset, collectively legal states 702. In other words, there may be no transition from legal states 702 to any states in illegal states 704 (e.g., states S10, S11, and S12).

The diagram of FIG. 7 may apply to registers in a given configuration. When the given configuration changes, the diagram of FIG. 7 may change accordingly. For example, tools 576 of FIG. 5 may perform retiming operations that change the configuration of the registers (e.g., move registers across portions of combinational logic). The number of registers itself may be different in the retimed circuit, which implies that the number of states may also be different in the retimed circuit. Thus, the original reset sequence may not be able to account for the configuration changes and properly reset the registers in the changed configuration to the reset state.

Figure 8A:
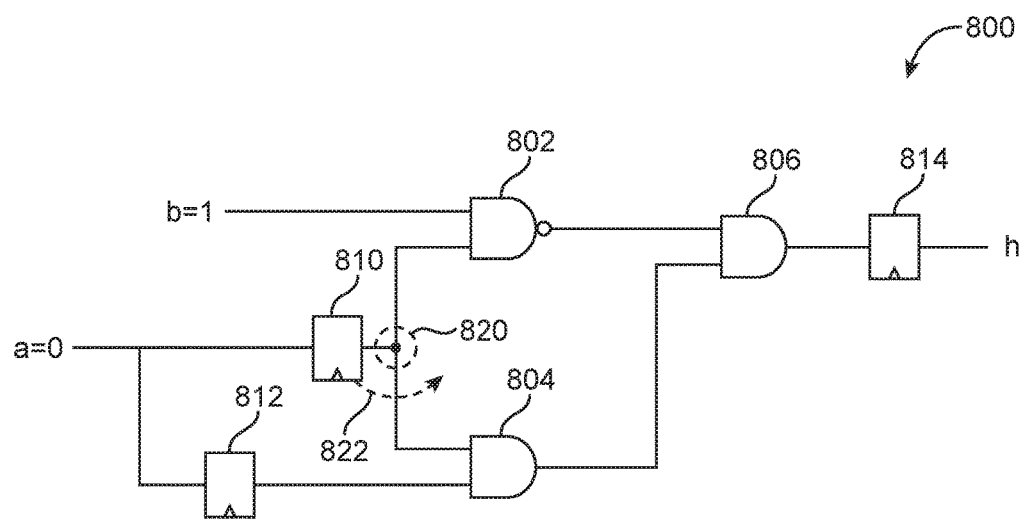
FIG. 8A is a diagram of an illustrative circuit prior to retiming in accordance with an embodiment.

In particular, FIG. 8A shows an illustrative circuit such as circuit 800 within integrated circuit 100 that may be retimed to operate more efficiently as described in FIG. 2. Circuit 800 may include logic NAND gate 802, logic AND gates 804 and 806, and registers 810, 812, and 814. One or more of registers 810, 812, and 814 may be pipeline registers.

Logic NAND gate 802 may have a first input that is coupled to input b. Logic NAND gate 802 may have a second input that is coupled to an output of register 810. An input terminal (e.g., data input terminal) of register 810 may be coupled to input a. AND gate 804 may have two input terminals. A first input terminal of AND gate 804 may be coupled to the output terminal of register 810. A second input terminal of AND gate 804 may be coupled to an output of register 812. An input terminal (e.g., data input terminal) of register 812 may be coupled to input a. AND gate 806 may have two input terminals. A first input terminal of AND gate 806 may be coupled to an output terminal of NAND gate 802. A second input terminal of AND gate 806 may be coupled to an output terminal of AND gate 804. Register 814 may receive an output of AND gate 806 and provide an output h. Registers 810, 812, and 814 may be clocked using a given clock signal (e.g., registers 810, 812, and 814 may be part of the same clock domain). This is merely illustrative. If desired, any suitable clocking configuration may be used.

The power-up process for circuit 800 may be performed using initialization circuitry (not shown) within integrated circuit 100. The initialization circuitry may also perform resetting operations using reset sequences. As described in connection with FIG. 7, after power-up and prior to reset, pipeline registers may hold an unknown state. For example, register 810 may hold value "0", register 812 may hold value "0", and register 814 may hold value "1". Alternatively, registers 810, 812, and 814 may power up to any other state. Registers 810, 812, and 814 may be reset using a reset sequence to provide a known reset state values to registers 810, 812, and 814. For example, circuit 800 may have a reset state of register 810 holding value "0", register 812 holding value "0", and register 814 holding value "0". The associated reset sequence to bring circuit 800 to the reset state includes a single transition clocked for a single clock cycle using a clock signal. In particular, during the single clock cycle, NAND gate 802 may receive value "1" from input b, while registers 810 and 812 may receive value "0" from input a.

After the single clock cycle, registers 810 and 812 are provided with known values of "0". Register 814 may also be at a known state of "0" because regardless of previous values stored in registers 810 and 812, register 814 will be holding a value of "0" after the single clock cycle. For example, as previously described, if registers 810 and 812 both hold values of "0" prior to the single clock cycle, AND gate 806 will receive a value of "1" at its first input terminal and a value of "0" at its second input terminal, and will provide a value of "0" to register 814 during the single clock cycle. Other scenarios are omitted as to not unnecessarily obscure the present embodiment.

In an embodiment, tool 576 may perform retiming on circuit 800 of FIG. 8A to move register 810 across node 820 (e.g., fan-out node 820) as indicated by dashed arrow 822. Subsequent to retiming operations, circuit 800 of FIG. 8A may be transformed into retimed circuit 800' of FIG. 8B.

As a result of retiming, register 810 may be removed from the retimed circuit 800' and replaced by registers 810-1 and 810-2. The second input terminal of NAND gate 802 may be coupled to an output terminal of register 810-1. A data input terminal of register 810-1 may receive values from input a. The first input terminal of AND gate 804 may be coupled to an output terminal of register 810-2. A data input terminal of register 810-2 may receive values from input a.

As previously described in connection with resetting register 814, register 814 may be at known value of "0" regardless of the previous values stored in registers 810 and 812 after the single clock cycle. In other words, the value stored at register 814 may be deterministic after the single clock cycle. However, in retimed circuit 800' the value stored at register 814 may not be deterministic after the single clock cycle. For example, after power-up and prior to reset operations, registers 810-1, 810-2, and 812 may have logic values of "0", "1", and "1", respectively. Therefore, after the single clock cycle reset as described in FIG. 8A, AND gate 806 may receive a logic value of "1" at its first input and also a logic value of "1" at its second input. As a consequence, register 814 may hold a logic value of "1" after the single cycle and retimed circuit 800' may not be in a reset state. Since with at least one possible power-up state of retimed circuit 800', retimed circuit 800' cannot reach the reset state using the single clock cycle reset sequence, it would be desirable to provide a new reset sequence that can properly help retimed circuit 800' reach the intended reset state.

An issue arises with the single clock cycle reset sequence when registers 810-1 and 810-2 may not hold/store the same value (e.g., when one holds a logic "0" and the other holds a logic "1"). If registers 810-1 and 810-2 were to store the same value, then the value stored at register 814 may be deterministic as in circuit 800. In order to provide registers 810-1 and 810-2 with the same value, an adjustment sequence may be appended (more specifically, prepended) to the single clock cycle reset sequence. In other words, the single clock cycle reset sequence may be delayed by a number of clock cycles of the adjustment sequence.

The adjustment sequence may have a given length (e.g., an adjustment length or a length based on an adjustment value) that specifies a number of transitions between states. In other words, the given length may determine a number of clock cycles that may be clocked by retimed circuitry (e.g., retimed circuit 800') to provide logic values to the registers to help reset the registers. For example, the given length may be calculated based on types of circuitry within integrated circuit 100. The calculation process may be determined by characterizing different circuits within integrated circuit 100 by their types, as detailed in subsequent embodiments.

To properly reset retimed circuit 800', the given length may be calculated to be equal to one. During the number of clock cycles (e.g., while implementing the adjustment sequence), random values (e.g., logic values of "0" and/or "1") may be provided to the registers (e.g., registers 810-1, 810-2, and 812) by applying random values to the primary inputs. Because the input terminals of registers 810-1 and 810-2 are both coupled to fan-out node 820, which is coupled to input a, during the adjustment sequence lasting one clock cycle, when a random logic value of "1" or "0" is provided at input a, registers 810-1 and 810-2 may be provided with the same random value. As such, after implementing the adjustment sequence using the initialization circuitry, the single clock cycle reset sequence may be used to properly reset retimed circuit 800'.

The adjustment sequence may substantially depend on the number of clock cycles and not primary data inputs (e.g., data provided to registers). In other words, the registers are allowed to receive random primary input values during the entirety of the adjustment sequence. Thus, the adjustment sequence may be referred to as having a number of "empty" clock cycles.

The reset sequence prepended by the adjustment sequence may be referred to as an adjusted reset sequence or retimed reset sequence. The example of the adjustment sequence having a length of one is merely illustrative. If desired, the adjustment sequence may have any suitable length. The adjustment sequence may also provide values that are non-random, if desired.

In accordance with an embodiment, circuits such as circuit 800 shown in FIG. 8A may be referred to herein as an "original" circuit (e.g., a circuit before retiming or generally a circuit before any registers moves for optimization, such as register merging, register duplication, etc.). The reset sequence associated with the original circuit may be referred to herein as an "original" reset sequence. Circuits that have been modified such as circuit 800' shown in FIG. 8A may be referred to herein as a retimed circuit (e.g., a circuit after retiming). The reset sequence associated with the retimed circuit may be referred to herein as a "retimed" reset sequence, referring generally to account for various types of register moves, as an "adjusted" reset sequence.

In particular, circuits (e.g., circuit 800') may be referred to herein as c-cycle delayed versions of original circuits (e.g., circuit 800) because an adjustment sequence of c clock cycles may be used to delay an original reset sequence to generate an adjusted reset sequence. For example, circuit 800' may be a 1-cycle delayed version of circuit 800 because an adjustment sequence of one clock cycle may be used to delay the original reset sequence to generate the adjusted reset sequence.

Figure 9:
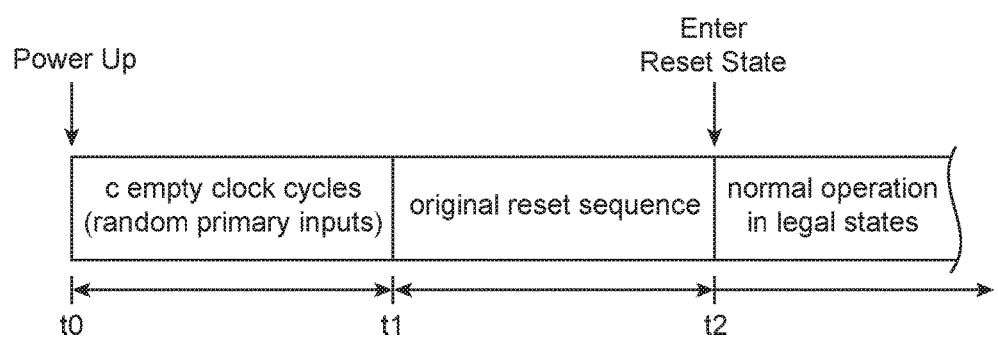
FIG. 9 is an illustrative timing diagram for operating initialization circuitry to prepare registers for entering normal operations after power-up in accordance with an embodiment.

FIG. 9 shows an illustrative timing diagram for operating initialization circuitry (e.g., start-up circuitry, power-up circuitry, etc.) within an integrated circuit after retiming operations (e.g., integrated circuit 100) to properly prepare the integrated circuit for normal operations. At time t0, integrated circuit 100 and pipeline registers within integrated circuit 100 may be powered-up (e.g., provided with one or more power sources). After power up, initialization circuitry may provide c number of "empty" clock cycles to the retimed circuit. In other words, after power-up, initialization circuitry may provide an adjustment sequence to the integrated circuit 100. The number c (sometimes referred to herein as adjustment value c) therefore defines the length of the adjustment sequence.

At time t1, the initialization circuitry may have finished implementing the adjustment sequence of length c. The initialization circuitry may then provide an original reset sequence to the integrated circuit 100. A designer or user may provide the original reset sequence prior to design tools 520 moving registers within integrated circuit 100 for optimization (e.g., moving registers for retiming, merging, etc.). At time t2, integrated circuit 100 may be ready to begin normal operations. In other words, the registers within integrated circuit 100 may have entered a reset state. Subsequent operations of the registers may occur within legal states.

Figure 10A:
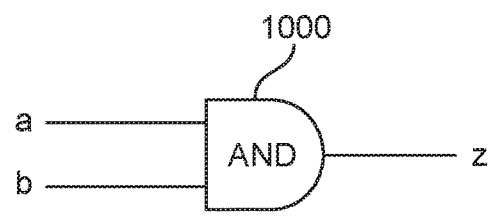
FIG. 10A is a diagram of an illustrative justifiable circuit element in accordance with an embodiment.

The length c of an adjustment sequence (sometimes referred to simply as adjustment/delay value c) may be calculated by first characterizing types of register movement. In an embodiment, the type of circuit element registers move across may affect the counter value of the circuit element and consequently adjustment value c. In particular, FIG. 10A shows logic AND gate 1000. Logic AND gate 1000 may have first input a, second input b, and output z. Logic AND gate 1000 may be a justifiable element.

A justifiable element is defined as a circuit element whereby all of its output value combinations is obtainable using some combination of its input values. For example, logic AND gate 1000 may have only one output (e.g., output z). All of the possible output values of output z includes a logic value of "0" or a logic value of "1". When input a has a logic value of "0" and input b has a logic value of "0", output z may have a logic value of "0". In other words, an output value of "0" is obtainable using at least one set of input values {0,0}. When input a has a logic value of "1" and input b has a logic value of "1", output z may have a logic value of "1". In other words, an output logic value of "1" is obtainable using at least one set of input logic values {1,1}. Because both output logic values "0" and "1" are separately obtainable, logic AND gate 1000 is a justifiable element.

Figure 10B:
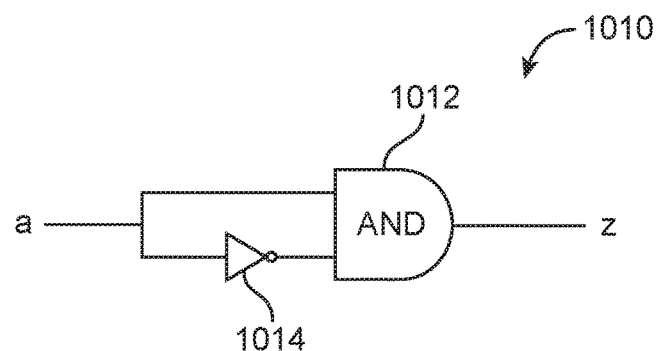
FIG. 10B is a diagram of an illustrative non-justifiable circuit element in accordance with an embodiment.

FIG. 10B shows circuit 1010, which includes logic AND gate 1012 and inverter 1014. A first input of AND gate 1012 receives input a, while a second input of AND gate 1012 receives an inverted input a via inverter 1014. AND gate 1012 may generate an output value at output z. Circuit 1010 may therefore receive input a and generate output z. Circuit 1010 may be a defined as a non-justifiable element as described below.

A non-justifiable element may be a circuit element that does not satisfy the requirements of a justifiable element as previously described. In particular, an output logic value of "1" is unobtainable for circuit 1010 with any of its input combinations.

Figure 8B:
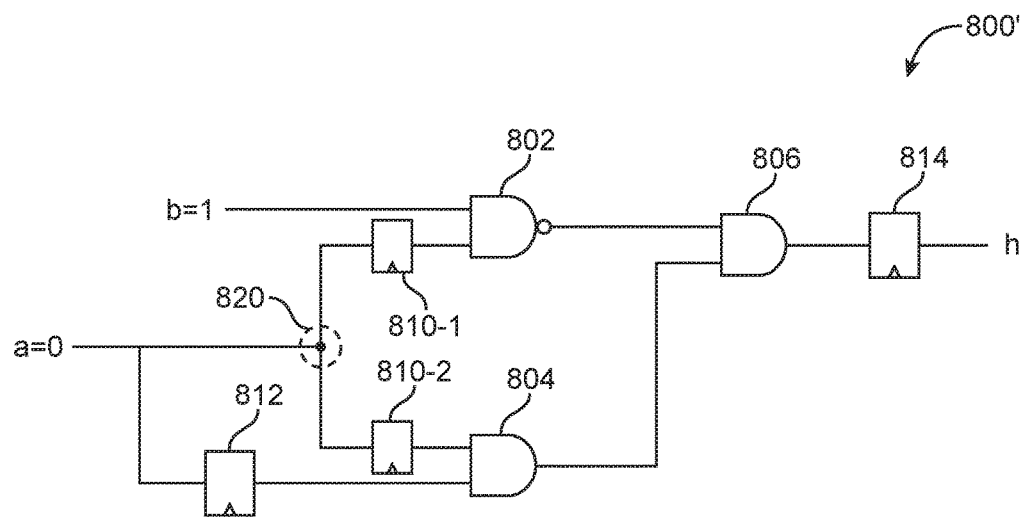
FIG. 8B is a diagram of a retimed version of the circuit of FIG. 8A in accordance with an embodiment.
Figure 10C:
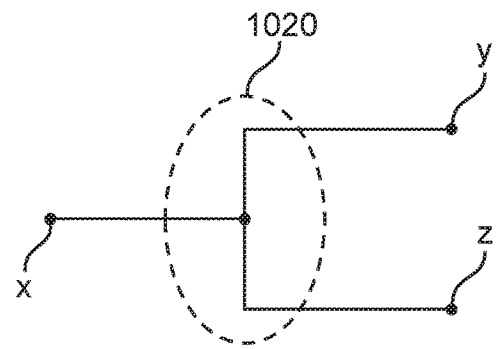
FIG. 10C is a diagram of an illustrative fan-out circuit that is a non-justifiable element in accordance with an embodiment.

In accordance with an embodiment, FIG. 10C shows fan-out circuit 1020 (e.g., a fan-out node that branches out, such as fan-out node 820 of FIG. 8B). Fan-out circuit may have input x, and outputs y and z. Fan-out circuit 1020 may be a non-justifiable element. In particular, output value combinations in which the value at output y is different from the value at output z are unobtainable (e.g., impossible to generate using the input values) since the two output nodes are effectively shorted. In other words, fan-out circuit 1020 may not be able to generate an output combination where output y has an output logic value of "1" and output z has an output logic value of "0" or vice versa.

A counter value c (sometimes referred to herein as a register move counter value c) may be maintained by each non-justifiable circuit element across which registers move. Alternatively, circuitry external to the non-justifiable circuit elements may maintain the c counter values associated with each corresponding non-justifiable circuit element. For simplification, when a non-justifiable element is indicated to maintain its c counter value, it may be that the c counter value is stored at any location internal or external to the non-justifiable element. If desired, justifiable circuit elements may (always) have a c counter value of zero. Adjustment value c may be the largest value of all of the c counter values (e.g., the maximum value of the c counter values).

FIGS. 10A-10C are merely illustrative. If desired any circuitry may be characterized as being justifiable or non-justifiable. For example, other logic gates, other types of fan-out circuits, LUTs, or any suitable circuitry may be classified as a justifiable element or a non-justifiable element. The circuitry classified as a non-justifiable element may then maintain a register move counter value c.

Prior to retiming, register merging, register duplication, or any other process that may move registers across a circuit element, the c counter value for all circuit elements (including non-justifiable circuit elements) may be zero. As retiming and other register movement processes occur, a c counter value at a given non-justifiable circuit element may increase by one for each set of registers that moves across the given non-justifiable circuit element in a forward direction (e.g., in a direction from input side of the given non-justifiable element to the output side of the given non-justifiable element).

Moving a given set of registers across the given non-justifiable element in a forward direction may include removing a register from each input of the given non-justifiable element and adding a register to one or more outputs of the given non-justifiable element. Such a movement may increase the c counter value maintained at the given non-justifiable element by one. Moving two given sets of registers across the given non-justifiable element in a forward direction may include removing two registers from each input of the given non-justifiable element and adding two registers to one or more outputs of the given non-justifiable element. Such a movement may increment the c counter value maintained at the given non-justifiable element by two. The updated c counter value at the given non-justifiable element may be maintained indefinitely (e.g., maintained to account for any future updates). If desired, the c counter values may be persistently maintained until an adjustment value is calculated to generate a reset sequence of the final retimed circuit.

As an example, AND gate 1000 in FIG. 10A may have a register (not shown) coupled to each of its inputs a and b. In this configuration, the c counter value may be zero. During forward retiming, the registers at each of its inputs may be removed and a new register may be added at its output z. Subsequent to retiming operations, the c counter value may remain at zero because AND gate 1000 is a justifiable element.

As another example, circuit 1010 in FIG. 10B may have two registers (not shown) coupled to output z. In this configuration, the c counter value may be zero. Circuit 1010 may be designed (by a user) with such a configuration. During backward retiming, a single register from output z may be removed and a corresponding register may be added to input a of circuit 1010. Subsequent to this retiming operation, the c counter value may remain at zero while circuit 1010 is a non-justifiable element. The movement constitutes a backward movement (e.g., a movement of registers from an output side of circuit 1010 to an input side of circuit 1010). A backward movement across a non-justifiable element may decrement the c counter value (analogous to forward movement incrementing the c counter value). However, the c counter value may only be a non-negative integer (e.g., a whole number). As such, the minimum value of c counter value is limited to floor value of zero.

As a further example, circuit 1020 in FIG. 10C may have three registers (not shown) coupled to input x. In this configuration, the c counter value may be zero. During forward retiming, two of the three registers may be removed from input x and two corresponding registers may be added to each of the outputs of circuit 1020 (e.g., outputs y and z). Subsequent to the retiming operation, the c counter value may be incremented by two, since two registers were moved forward across a non-justifiable element (e.g., circuit 1020).

While moving registers during retiming was described in connection with FIGS. 10A-10C, this is merely illustrative. If desired, register movement outside of retiming may prompt adjusting a corresponding c counter value. In other words, as previously described, c counter values (for each non-justifiable element) may be maintained and updated during retiming as performed by tools 576 of FIG. 5 during step 617 of FIG. 6.

In addition, c counter values may be maintained an updated prior to retiming operations. For example, optimization tools 574 of FIG. 5 may perform register duplication and register merging during step 608 or 617 of FIG. 6. Thus, c counter values may be maintained and updated during optimization operations as performed during step 608 or 617. The final updated c counter values after step 608 or 617 for each non-justifiable element may be subsequently used and updated during retiming. In fact, if desired, c counter values may be maintained and updated throughout the design process (e.g., for any or all steps of the design process) to account for any qualifying forward movement of registers across non-justifiable elements. For example, during logic synthesis, physical synthesis, placement, routing, etc., c counter values may be continually and persistently maintained and updated.

Figure 11A:
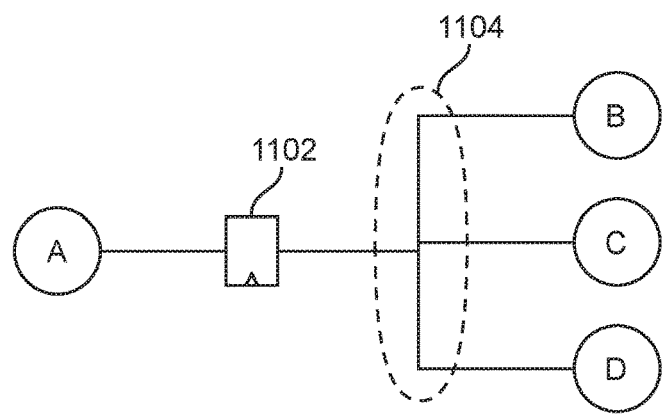
FIGS. 11A-11C are diagrams of illustrative circuits of possible configurations after register duplication and register merging operations in accordance with an embodiment.
Figure 11B:
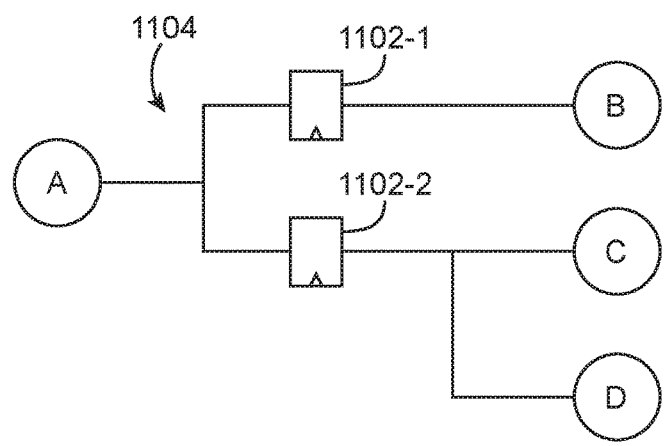
Figure 11C:
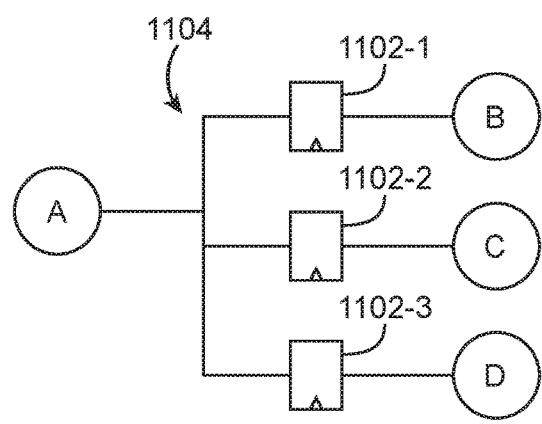

In accordance with an embodiment, FIGS. 11A-11C shows illustrative circuit configurations associated with register duplication and merging. In particular, FIG. 11A shows elements A, B, C, and D. For example, circuit elements A-D may be lookup table (LUT) circuit. Element A is coupled to each of elements B, C, and D through both register 1102 and fan-out circuit 1104 (e.g., fan-out node that separates into three different branches). In this configuration register 1102 may be shared by elements B, C, and D. Fan-out node 1104 may be referred to herein as a global net associated with node 1104.

Register duplication may occur when two or more elements connected to a single register may be far away from one another. Because the two or more elements are far away from one another, it may be easier to synchronize the timing of the two or more elements using two or more separate registers. This is merely illustrative. If desired, register duplication may occur as part of any operation to optimize the timing of elements within an integrated circuit.

As an example, elements B and C may be spaced far away from each other (e.g., on a floorplan of integrated circuit 100). During register duplication, register 1102 may be removed, and in its place, registers 1102-1 and 1102-2 may be added to the two outputs of fan-out circuitry 1104 coupled to elements B and C. In other words, the global net associated with node 1104 may be split into two. Configuration-wise, this forward move may be equivalent to a forward retiming move across fan-out circuitry 1104. In this configuration, register 1102-1 may be coupled to only element B (and not elements C and D), while register 1102-2 may be coupled to both elements B and C.

Furthermore, it may be desirable to perform further register duplication such that each of elements B, C, and D has its own dedicated register. As shown in FIG. 11C, register 1102-3 may be further added. In other words, the global net associated with node 1104 may be further split into three. In this configuration, register 1102-1 may be coupled only to element B, register 1102-2 may be coupled only to element C, and register 1102-3 may be coupled only to element D.

As discussed previously, each non-justifiable element may maintain and update its own separate c counter value. In addition, when a given non-justifiable element includes more than two outputs, a d counter value (sometimes referred to herein as a duplicate counter value d or a duplication counter value d) may also be maintained and updated at the non-justifiable element. Duplication counter value d may indicate a number of duplications that has occurred, which may generally be equal to one less than the number of registers added on the output side.

For example, in FIGS. 11A-11C, fan-out circuit 1104 may be a non-justifiable element. Thus, when register 1102 in FIG. 11A is removed and registers 1102-1 and 1102-2 are added in FIG. 11B, as previously described, c counter value for circuit 1104 may increase by one. In addition, since circuit 1104 includes more than two outputs (e.g., output to element B, output to element C, and output to element D), duplication counter value d may be maintained and updated. In this scenario, only one instance of duplication has occurred. Therefore, duplication counter value d is incremented to a value of one. When register 1102-3 is further added, since the circuit 1104 has already been visited and the corresponding c counter value has already been added, the c counter value for circuit 1104 may remain the same. In this scenario, the duplication counter value d for circuit 1104 may be incremented by one since another instance of duplication has occurred.

In other words, circuit 1104 in FIG. 11A may have a c counter value of zero (e.g., a register move counter value of zero) and a d counter value of zero (e.g., a duplication counter value of zero). Circuit 1104 in FIG. 11B, may have a c counter value of one and a d counter value of one. Circuit 1104 in FIG. 11C may have a c counter value of one and a d counter value of two.

FIGS. 11A-11C may also show possible configuration for register merging. Register merging may be implemented to save register resources or for any other desirable reason. When register merging occurs for a non-justifiable element, the d counter value for the non-justifiable element may be decremented first until the d counter value is zero, at which time the c counter value for the non-justifiable element may be decremented by one. The c counter value may not be negative and may have a floor value of zero.

As an example, register merging may begin with a circuit such as the circuit shown in FIG. 11C. In FIG. 11C, elements C and D may each have its own dedicated register, respectively, registers 1102-2 and 1102-3. Register merging may occur to merge registers 1102-2 and 1102-3 such that elements C and D share a common register (e.g., register 1102-3 in FIG. 11B).

As previously discussed, the c counter value for circuit 1104 in FIG. 11C may be one, and the d counter value for circuit 1104 in FIG. 11C may be two. Thus, when registers 1102-2 and 1102-3 are merged, the d counter value for circuit 1104 in FIG. 11C may be decremented by one, thereby generating the configuration of FIG. 11B and counter values of circuit 1104 in FIG. 11B (e.g., c counter value of one and d counter value of one). It is worth noting that the c counter value was not decremented when this register merging occurred, since the d counter value has not become zero.

In addition, registers 1102-1 and 1102-2 may be further merged during register merging. When registers 1102-1 and 1102-2 are merged, the d counter value for circuit 1104 in FIG. 11B may be decremented by one. As such the d counter value may reach zero, and consequently, the c counter value may also be decremented by one, thereby generating the configuration of FIG. 11A and counter values of circuit 1104 in FIG. 11A (e.g., c counter value of zero and d counter value of one). It is worth noting that the c counter value is non-negative and has a floor value of zero. Furthermore, the c counter values or move counter value c and the d counter values or duplication counter value d may be maintained on a per element basis (e.g., a different set of values for each element) as well as a per clock basis (e.g., a different set of values for each clock domain).

The embodiments previously described in connection with FIGS. 7-10 may be implemented during local retiming within a design of an integrated circuit (e.g., integrated circuit 100). Local retiming may be used after design tools 520 identifies a critical path to be optimized (e.g., optimized with retiming, register merging, register duplication, etc.). As such, the critical path may include non-justifiable elements, for which respective c (and optionally, d) counter values are maintained and upgraded.

As an example, during local retiming, a set of register moves (e.g., register movements) may be first assessed based on a number of factors (e.g., optimizing operating frequency, latency, etc.). A subset of the number of register moves, if any, are accepted by design tools 520. Only accepted register moves (register moves implemented within the logic design) may impact the c (and optionally, d) counter values.

In accordance with an embodiment, the embodiments of FIGS. 7-10 may also be used during global retiming. For example, each circuit element within integrated circuit 100 may be classified as justifiable/non-justifiable. The circuit elements within integrated circuit 100 may maintain corresponding register move counter values. After global retiming is performed, the movement of registers across the circuit elements may be tracked. The corresponding register move counter values for the circuit elements within integrated circuit 100 may be updated according to the tracked movement of the registers across the circuit elements.

In a complex design, there may be a large number of registers and elements to account for, and consequently, global retiming may be performed using systems of equations that are solved to meet certain constraints. Therefore, to simplify the process of calculating c counter values, two given elements and registers between the two given elements may be represented by nodes and edges in a graph. This is merely illustrative. If desired, embodiments implemented during local retiming may also use a graph to represent registers and elements within an integrated circuit.

Figure 12:
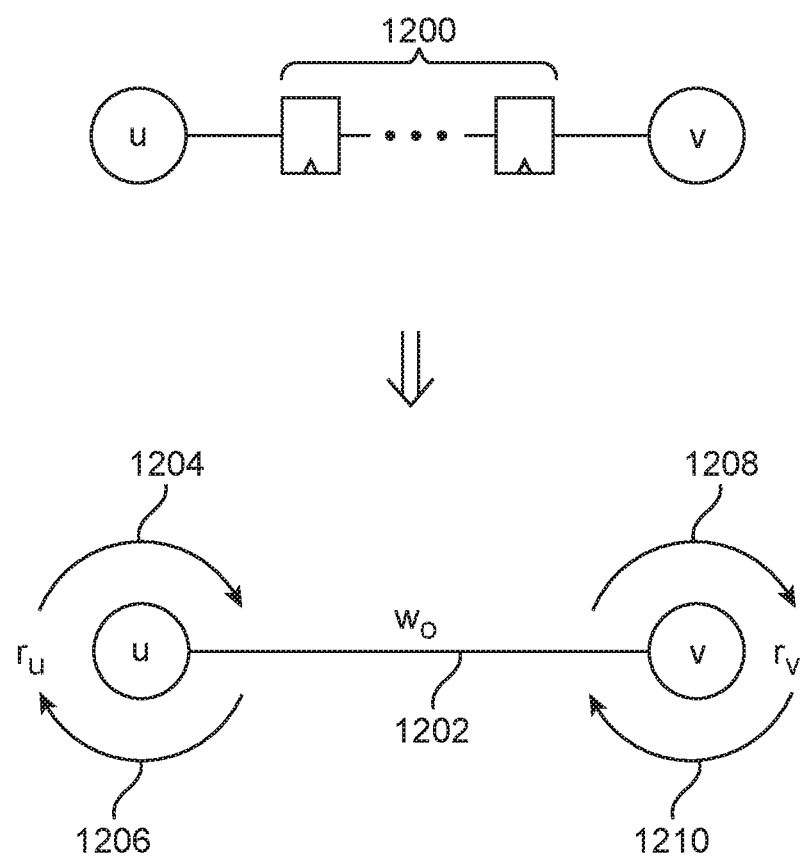
FIG. 12 is a diagram of an illustrative retiming graph with nodes and edges that is used to represent a number of registers linking two circuit elements in accordance with an embodiment.

In accordance with an embodiment, design tools 520 may model (e.g., represent) elements u and v, and registers 120 between elements u and v using a retiming graph, as shown in FIG. 12. The graph may include nodes u and v representing elements u and v. The graph may also include edge 1202 (e.g., path 1202) that connects node u to node v. The edge may have a weight $w_o$ that reflects the number of registers 1200 between elements u and v. Nodes u and v may maintain values $r_u$ and $r_v$ (sometimes referred to herein as retiming variables $r_u$ and $r_v$), respectively. For example, nodes u and v may represent non-justifiable elements. Values $r_u$ and $r_v$ are associated with the movement of registers across nodes u and v, respectively.

By convention, a forward move of registers across node u as indicated by arrow 1204 may result in a negative integer value $r_u$. A backward move of registers across node u as indicated by arrow 1206 may result in a positive integer value $r_u$. Similarly, a forward move of registers across node v as indicated by arrow 1208 may result in a negative integer value $r_v$. A backward move of registers across node v as indicated by array 12010 may result in a positive integer value $r_v$. Using this convention, an exemplary register balance equation for updating the graph with a new weight (e.g., weight $w_{new}$) for edge 1202 after moving registers may be represented as follows:

$$w_{new} = r_v + w_o - r_u \quad (1)$$

As such, value r for a given non-justifiable element may be subtracted from a c counter value for the given non-justifiable element to generate an updated c counter value for the given non-justifiable element. If desired, the c counter value may have been provided from previous steps of logic design. The largest updated c counter value for all non-justifiable elements may be selected as the adjustment value, as previously described.

This use of convention is merely illustrative. If desired, any other suitable conventions may be used to accurately account for a number of registers between any two elements.

Figure 13:
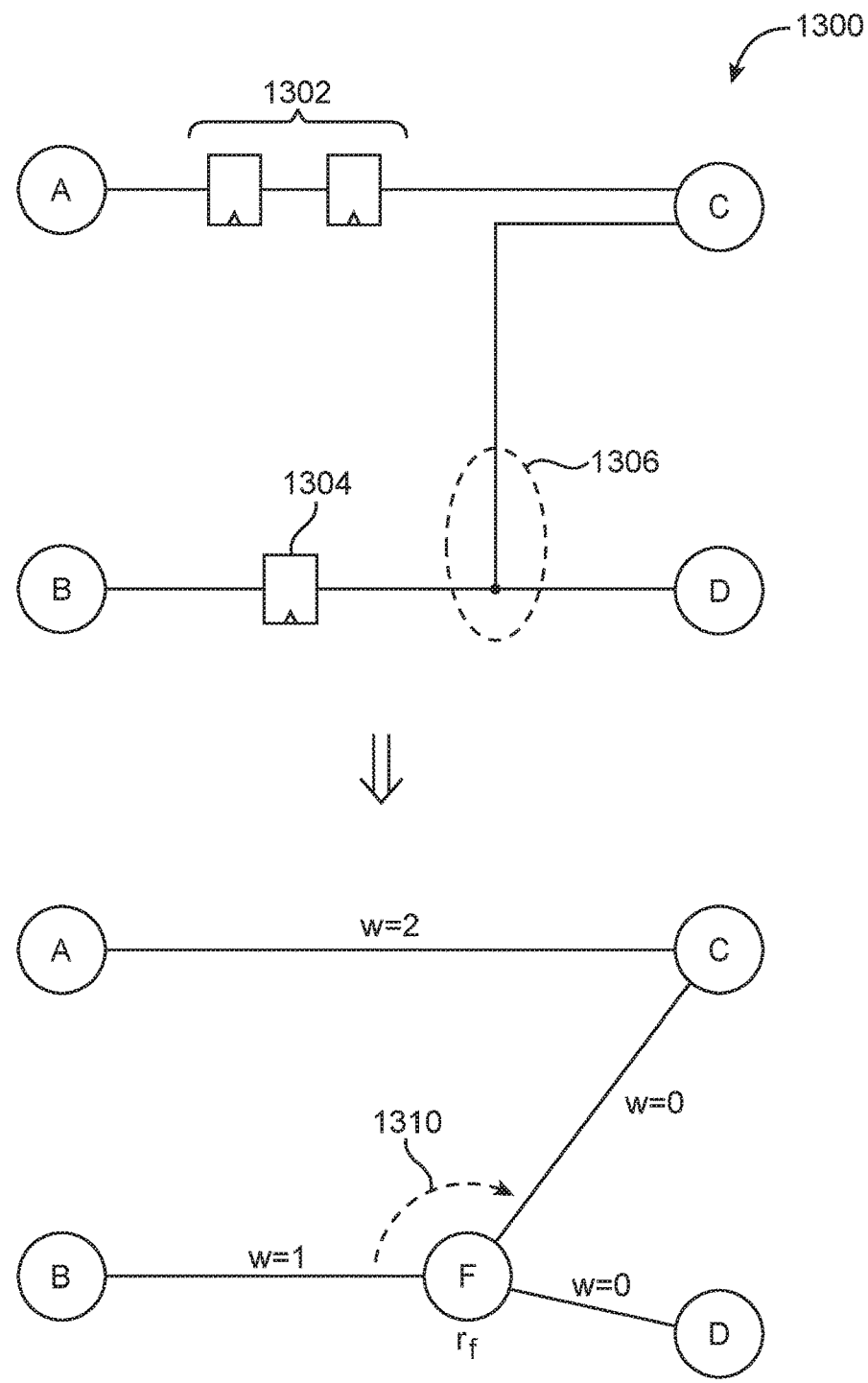
FIG. 13 is a diagram showing how a fan-out node may be modeled as a non-justifiable circuit element in a retiming graph in accordance with an embodiment.

Using the graph representation as described in connection with FIG. 12, fan-out circuits or fan-out nodes may be represented by or modeled as a circuit element (e.g., element u or element v in FIG. 12). FIG. 13 shows a detailed graph representation for modeling fan-out circuits using circuit 1300, which includes a fan-out node.

As shown in FIG. 13, circuit 1300 may include elements (e.g., logic elements) A, B, C, and D, groups of registers 1302 and 1304, and fan-out circuit 1306. In the graph representation of circuit 1300, vertices/nodes A, B, C, and D may respectively represent elements A, B, C, and D. Additionally, fan-out circuit 1306 may be represented by vertex F. Because vertex F represents a non-justifiable element (e.g., a fan-out circuit), values $r_f$, c, and d should be maintained and updated for vertex F.

As previously described, because two registers couple element A to element C, an edge coupling vertices A and C may have a weight of two. Similarly, because one register couples element B to fan-out node 1306, an edge coupling vertices B and F may have a weight of one. Since no registers couple fan-out node 1306 to either element C or D, the corresponding edges have weights of zero.

As an example, dashed arrow 1301 may indicate a possible forward movement of register 1304, which would decrease $r_f$ by one. After solving the three corresponding register balancing equations, the weights for the edge connecting vertex B to vertex F, the edge connecting vertex F to vertex C, and the edge connecting vertex F to vertex D may be zero, one, and one, respectively.

During global retiming operations, any desired elements may be modeled using this type of graphical representation. Using the graphical representation of FIG. 13, a large number of register balancing equations may be generated using design tools 520. The register balancing equations may be provided to a solver (e.g., a constraint solver or other suitable type of solver engine). The solver engine may also take other inputs from global retiming operations or any other suitable inputs. The solver may then output values (e.g., $r_i$ for i non-justifiable elements) associated with any movement across each non-justifiable element.

Each non-justifiable element that maintains a corresponding $r_i$ value may also maintain a c counter value from other design steps (e.g., a c counter value maintained during local retiming, register merging, register duplication, etc.). Each $r_i$ value may be subtracted from the corresponding c value to generated an updated c counter value, with a minimum value of zero for the updated c counter value. The largest updated c counter value of all non-justifiable elements over a given clock domain may be used as the adjustment value for the given clock domain. As previously described, the adjustment value may indicate a number of empty clock cycles within the adjustment sequence. The adjustment sequence may then be prepended to the original reset sequence to generate an adjusted reset sequence.

Figure 14:
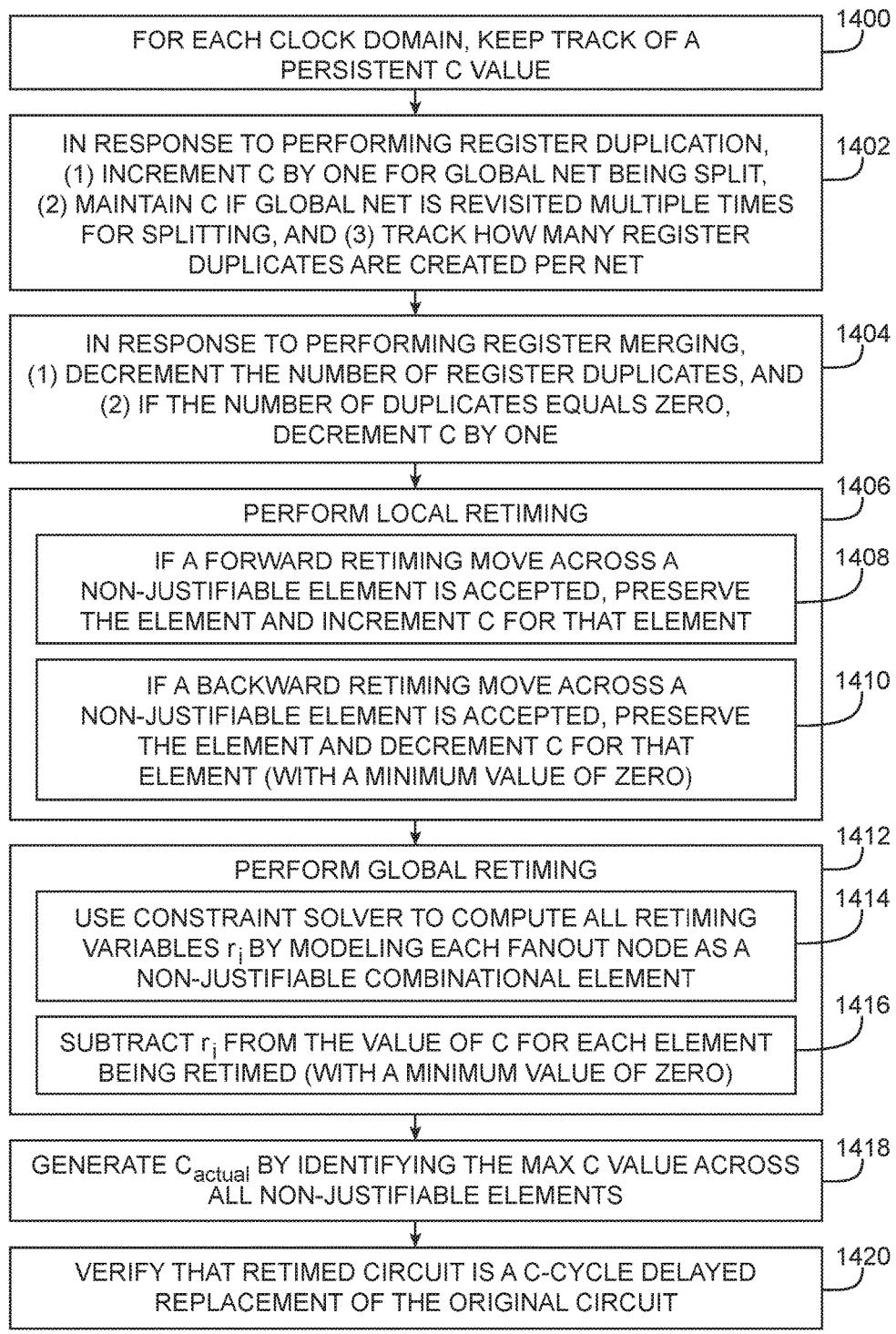
FIG. 14 is a flow chart of illustrative steps for computing an adjustment value and providing a corresponding adjusted reset sequence with prepended clock cycles for resetting registers in a retimed circuit design in accordance with an embodiment.

FIG. 14 shows a flow chart for generating an adjusted reset sequence by maintaining and updating counter values to provide an adjustment value.

At step 1400, for each clock domain and for each element (e.g., for each non-justifiable element), integrated circuit design tools design tools 520 may keep track of a persistent c counter value.

At step 1402, in response to performing register duplication (e.g., during synthesis and optimization), design tools 520 may increment any c counter value accordingly when a corresponding global net is being split (e.g., during a forward move of registers as a result of duplicating the registers). In addition, design tools may maintain any c counter value at its given value, when the corresponding global net was previously visited (e.g., a corresponding c counter value was previously incremented). To accurately calculate a number of times a given global net has been revisited, the design tools may maintain and update a d counter value that tracks how many register duplicates are created on a per global net basis, per clock-domain basis.

At step 1404, in response to performing register merging (e.g., during synthesis and optimization), the design tools may decrement any d counter value representing a decrement of a corresponding number of register duplicates. If a given number duplicates (as represented by a corresponding d counter value) for any global net equals zero, the design tools may decrement the corresponding c counter value by one.

At step 1406, tools 576 of FIG. 5 may perform local retiming. Steps 1408 and 1410 may occur while performing locating retiming. While performing the local retiming, if a forward retiming move across a non-justifiable element is accepted, the design tools may preserve the element and increment a corresponding c counter value for the element at step 1408. While performing the local retiming, if a backward retiming move across a non-justifiable element is accepted, the design tools may preserve the element and decrement a corresponding c counter value for the element at step 1410. Any c counter value may have a minimum value of zero (e.g., a given c counter value may not be decremented to a number below zero).

At step 1406, tools 576 of FIG. 5 may perform global retiming. Steps 1414 and 1416 may occur while performing the global retiming. Registers and elements (including fan-out circuits) may be represented in a graph with vertices and paths. The design tools may generate a system of equations based on the vertices and paths. The design tools may use a constraints solver to compute all retiming variables (e.g., values $r_i$ for each non-justifiable element), in particular, by modeling each fan-out node as a non-justifiable combinational element at step 1414. At step 1416, the design tools may subtract the values $r_i$ from a corresponding c counter value for each element being retimed (e.g., for each element across which register have moved). Similarly, any c counter value may have a minimum value of zero.

At step 1418, the design tools may generate an actual adjustment value (e.g., adjustment value c or $c_{actual}$) by identifying the maximum c value (e.g., the maximum c counter value) across all non-justifiable elements.

As previously described, the maximum c value (e.g., adjustment value c) may represent a number of empty clock cycles (with arbitrary primary input values) within an adjustment sequence. The adjustment sequence may prepend an "original" reset sequence (as previously defined) to generate an adjusted reset sequence.

At step 1420, the design tools may verify that the retimed circuit is a c-cycle delayed replacement of the original circuit. By providing the adjusted reset sequence, the retimed circuit (e.g., the registers within the retimed circuit) may be properly reset. In other words, the retimed circuit is "c-cycle (sequentially) equivalent" to the original circuit (i.e., if the retimed circuit is clock c number of times after power-up, it cannot be distinguished from the original circuit starting at all possible initial states from power-up.

In accordance with an embodiment, adjustment value c may be a conservative value. As an example, an alternative value smaller than c may exist and may be used to represent a different number of empty clock cycles within the adjustment sequence. The alternative value may correspond to a shorter adjustment sequence to be prepended before the original reset sequence to generate a shorter adjusted reset sequence. If desired, the adjustment value may be changed (e.g., decreased, reduced) to the alternative value. The shorter adjusted reset sequence may also properly reset the registers within the retimed circuit.

These steps are merely illustrative. The existing steps may be modified or omitted; some of the steps may be performed in parallel; additional steps may be added; and the order of certain steps may be reversed or altered.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/INTEL Corporation.

The foregoing is merely illustrative of the principles of this invention and various modifications can be made by those skilled in the art. The foregoing embodiments may be implemented individually or in any combination.

What is claimed is:

1. A method of operating an integrated circuit design tool implemented on computing equipment, comprising:
   receiving a circuit design that includes a plurality of registers that are resettable using a first reset sequence;
   performing a first register move operation on the circuit design to move a first register in the plurality of registers across a first circuit element in the circuit design;
   updating a first counter value associated with the first circuit element for a clock domain; and
   generating a second reset sequence by delaying the first reset sequence based on the first counter value for the clock domain, wherein the second reset sequence is at least associated with resetting the moved first register to a reset state.

2. The method of claim 1, wherein the first circuit element comprises a non-justifiable element.

3. The method of claim 2, wherein the non-justifiable element has inputs and outputs, wherein all possible output values at the outputs are not obtainable using some combination of input values received at the inputs.

4. The method of claim 2, wherein the non-justifiable element comprises a fan-out node.

5. The method of claim 1, wherein generating the second reset sequence comprises delaying the first reset sequence by an adjustment sequence having a number of clock cycles computed based on the first counter value for the clock domain.

6. The method of claim 1, further comprising:
   performing a second register move operation on the circuit design to move a second register in the plurality of registers across a second circuit element in the circuit design; and
   updating a second counter value associated with the second circuit element for the clock domain, wherein generating the second reset sequence comprises delaying the first reset sequence by an adjustment sequence having a number of clock cycles computed for the clock domain based on a maximum of the first and second counter values.

7. The method of claim 1, wherein performing the first register move operation on the circuit design comprises performing a register retiming operation.

8. The method of claim 1, wherein performing the first register move operation on the circuit design comprises performing a selected one of a register duplication operation and a register merging operation.

9. The method of claim 8, further comprising:
   updating a duplication counter value associated with the first circuit element when performing the selected one of the register duplication operation and the register merging operation for the clock domain.

10. A method of implementing an integrated circuit using integrated circuit design tools running on computing equipment, comprising:
    receiving a circuit design having a plurality of registers;
    performing a register move operation on the circuit design to move a register in the plurality of registers across a circuit element in the circuit design;
    updating a counter value assigned to the circuit element;
    generating a reset sequence based on the counter value;
    performing additional register move operations to move registers in the plurality of registers across additional circuit elements in the circuit design; and
    identifying non-justifiable circuit elements within the circuit element and the additional circuit elements, wherein generating the reset sequence comprises generating the reset sequence based on a maximum counter value in a plurality of counter values associated with the identified non-justifiable circuit elements.

11. The method of claim 10, wherein the circuit element has an input and an output, wherein performing the register move comprises performing a forward move that moves the register from the input of the circuit element to the output of the circuit element, wherein the updating the counter value comprises incrementing the counter value only if the circuit element is a non-justifiable element, and wherein the counter value is maintained for a given clock domain.

12. The method of claim 10, further comprising:
performing global retiming on the circuit design, wherein performing global retiming comprises using a constraints solver to compute a retiming variable value for the circuit element.

13. The method of claim 12, further comprising:
generating an updated counter value by subtracting the retiming variable value for the circuit element from the updated counter value assigned to the circuit element.

14. The method of claim 12, wherein generating the reset sequence comprises generating the reset sequence based on the updated counter value.

15. A method of operating an integrated circuit designed using retiming operations, the method comprising:
powering on the integrated circuit, wherein the integrated circuit includes registers that are powered on at an unknown state;
resetting the registers to a known state using an original reset sequence, wherein the registers receive predetermined primary input values during the original reset sequence; and
inserting a predetermined adjustment sequence before the original reset sequence, wherein the registers receive random primary input values during the predetermined adjustment sequence.

16. The method of claim 15, further comprising:
after the registers have reached the known state, operating the registers in legal states after the predetermined adjustment sequence and the original reset sequence have been performed.

17. The method of claim 15, wherein the predetermined adjustment sequence has a number of adjustment clock cycles computed based on the configuration of the registers.

18. The method of claim 17, wherein the retiming operations, register duplication operations, and register merging operations determine the configuration of the registers.

19. The method of claim 15, further comprising:
reducing the duration of the predetermined adjustment sequence without preventing the registers from reaching the known state.

* * * * *